April 12, 1949.                A. B. VAN HEE ET AL                2,467,244
                                ARTIFICIAL FISH BAIT
                                 Filed July 19, 1946
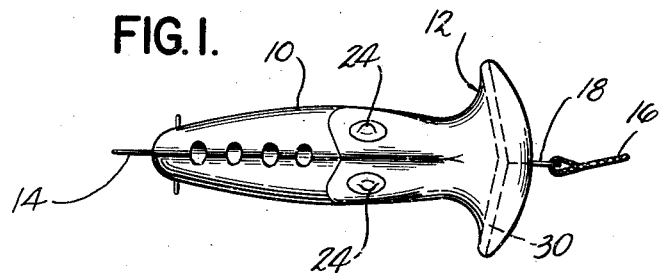
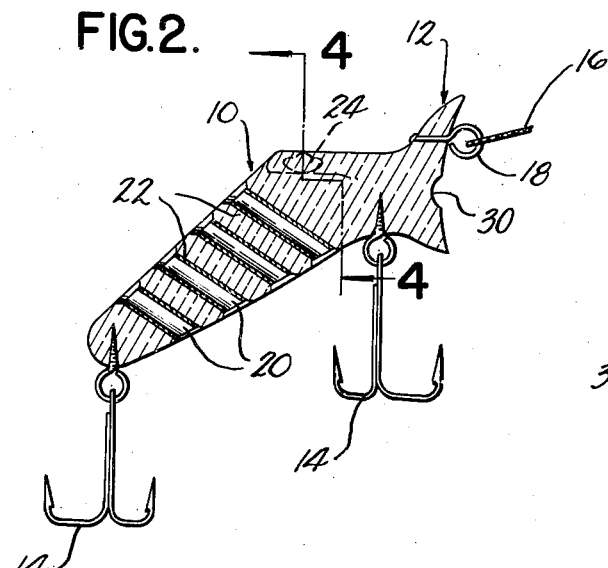
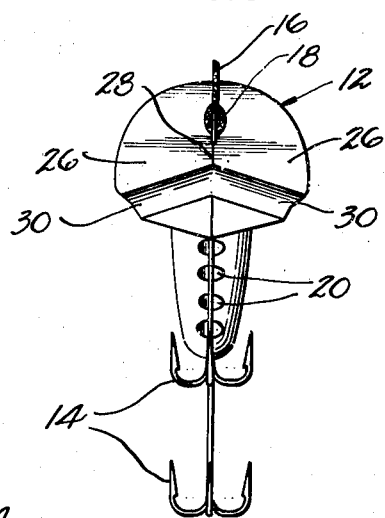
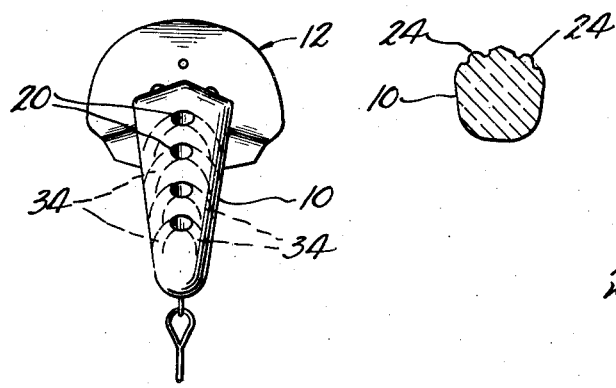
INVENTOR.
ACHIEL B. VAN HEE
WILLIAM A. VAN HEE
BY
Parker and Burton
ATTORNEYS.

Patented Apr. 12, 1949

2,467,244

UNITED STATES PATENT OFFICE 2,467,244

ARTIFICIAL FISH BAIT

Achiel B. Van Hee and William A. Van Hee, Detroit, Mich.

Application July 19, 1946, Serial No. 684,955

2 Claims. (Cl. 43—46)

This invention relates to artificial fish baits or lures and particularly to a translucent fish lure simulating the appearance and life-like movements of live fish bait.

An important object of this invention is to provide an artificial fish lure which is constructed in a novel manner to closely simulate the appearance and movements of live fish bait and which at the same time utilizes in a novel manner certain characteristics of light for enhancing the attractive qualities of the bait. Another important object of this invention is to provide such an artificial fish bait which is capable of being manufactured at low cost yet is formed in a novel manner to have the appearance and life-like motion of fish. Another important object of this invention is to provide a fish bait formed in a novel manner of material pervious to light and including novel means for forming a pattern, preferably contrastingly colored, which creates the illusion of a skeleton framework. A further important object of the invention is to provide a fish lure having a main body portion formed of one piece composed of light permeable material capable of transmitting daylight therethrough from one side to the other, the interior of which, as distinguished with the outside surface, is provided with novel means for imparting a highly attractive contrasting color pattern.

Various other objects, advantages and meritorious features will become fully apparent from the following specifications, appended claims and accompanying drawings wherein:

Fig. 1 is a top plan view of a fish lure constructed in accordance with the invention, Fig. 2 is a longitudinal sectional view through the fish lure of Fig. 1, Fig. 3 is a front elevation of the fish lure, Fig. 4 is a cross sectional view along line 4—4 of Fig. 2, and, Fig. 5 is a rear elevation of the fish lure.

In the embodiment of this invention illustrated herein the fish lure resembles in size and appearance a small fish such as a large mouthed chub. The invention, however, is not limited to such a construction but is capable of being shaped in any desirable way to attract fish such as in the form of a minnow, larger fish, animals or insects.

Referring to the drawings, the fish lure illustrated therein is formed of a single member composed of translucent material such that when immersed in water daylight is transmitted therethrough from one side to the other. A translucent plastic is the preferred material and a single block of this member is shaped into the desired formation. In order to resemble a fish, the translucent plastic member is shaped with an elongated body portion 10 having a relatively wide forward end section 12 which may resemble the large mouth of a fish such as a chub as herein shown or the head portion of a fish or animal. The translucent material of the member is preferably colorless but may if desired be colored throughout and permit daylight to be transmitted therethrough.

One or more gang hooks 14 are attached to the elongated body, preferably on one side thereof so that when immersed in water the bait is weighted to assume an upright position similar to that shown in Figs. 2 and 3. The line by which the bait is trailed through the water is indicated at 16 and is connected by any suitable means such as an eye 18 to the forward upper portion of the front end section 12.

The translucent material forming the body portion 10 is provided interiorly with means which is of different light permeable quality than the material of the body and sets up a pattern creating a varied optical effect. Preferably this is accomplished by providing portions of the interior of the body with a material which is less pervious to light and colored to sharply distinguish it from the material of the body. Since the latter is translucent, the coloring material in the interior of the body is clearly seen through the body portion 10 in whatever position it is turned.

To accomplish this end and also provide a life-like wobbling motion of the bait and a bubbling of water adjacent to the bait, the body portion 10 is provided with passages 20 at spaced intervals longitudinally which open out on opposite sides of the body. Preferably these passages extend substantially parallel to one another and open out through the top and bottom sides of the body portion 10. The normal position of the bait when drawn slowly through the water is that shown in Figs. 2 and 3. It is desired to have the passages 20 formed in the body so that they extend at an upward and rearward inclination when in this position. As the bait is advanced through the water, it is evident that water will enter the lower ends of the passages and flow upwardly therethrough and out of the top opening thereof. This action will produce a bubbling movement in the water around the bait body which in combination with the wobble produced by the forward end section 12 to be described hereinafter imparts a life-like movement to the bait.

The surfaces of the hollowed areas formed by the pasasges 20 are coated with a colored material. The coating is indicated at 22 and preferably extends the length of each passage. The colored coating material may be opaque but it is preferred to have it pervious to light rays so that light entering the body on one side and passing through the passages before leaving the body on the other side will be colored. The coloring material used for the coatings 22 lining the passages is preferably highly contrasting with the body portion. A desirable combination is a translucent colorless body portion 10 and coatings 22 of bright red. The pattern of the passages in such a combination creates the illusion of a skeleton framework in the translucent body.

In addition to this illusion, an important effect is also created by the refraction of light rays in the body. When the bait wobbles and rolls from side to side, the light rays from the passages pass through varying thicknesses of the body portion and the resulting variation in light refraction causes the colored passages 20 to appear to be distorted in varying degrees thereby improving the attracting qualities of the bait. This distortion is especially noticeable when the bait is viewed from the bottom and top and from the forward and rearward ends thereof.

Also in order to enhance the illusion of a live bait, two rounded protuberances 24—24 are provided on the forward end of the body portion 10 in the region of the eyes in order to simulate the eyes of a fish. The protuberances are preferably located in recesses of elliptical formation as shown in Figs. 1 and 4. A coating of coloring material, preferably the same color as that which lines the passages 20, may be applied to the protuberances.

In order to give the bait a life-like and attractive motion through the water, the forward section 12 is shaped in a novel manner. As previously explained the forward end of the bait in the illustrated embodiment of the invention is shaped in the form of a mouth of a fish and as herein shown is exaggerated in size relative to the body portion. This forward end portion may, however, have the general configuration of a head of a live bait, if desired, so long as it is shaped in the novel way hereinafter described to impart the life-like movement. As shown in Figs. 1, 2 and 3 the forward end portion 12 presents a shield-like front which is angularly offset to the longitudinal median line of the body portion 10. When drawn through the water, the body portion at times depends below the mouth or head portion 12 as shown in Fig. 3 and the forward directed openings of the passages 20 are exposed to the relative rearward flow of water below the mouth or head portion 12. This relationship in combination with other features of the forward portion 12 induces a vigorous up and down rocking movement to the bait as it is drawn through the water.

The front face of the shield-like portion 12 is inwardly or concavingly curved in a vertical direction as shown in Fig. 2. Laterally, the front face is divided into two angularly disposed halves 26—26 converging forwardly to a vertical common meeting edge 28 centrally of the front face as shown in Fig. 1. In each half of the front face is a groove 30 which as shown in Fig. 3 is slightly upwardly inclined as it approaches the common meeting edge 28. Both grooves open into communication with one another at the meeting edge 28. The resulting formation of the front face of the shield-like portion 12 produces a very vigorous wobble of the bait from side to side and up and down.

It is thus apparent that as the bait is drawn through the water it has a vigorous wobble both in an up and down manner and from side to side. The contrasting color effect and skeleton illusion provided by the colored lining of the passages 20 and the light refractive distortion thereof as the bait wobbles furnishes a highly attractive lure for fish. The refractive distortion of the colored lining of the passages 20 is illustrated in dotted outline in Fig. 5. When viewed from various positions, such as from the rear in Fig. 5, the colored linings 22 of the passages are distorted considerably beyond their original locations in the body portion 10. In Fig. 5 each lined passage 20 has the appearance of being two colored bands extending interiorly in arcuate formation conforming to the curved sides of the body as shown in dotted outline at 34. As the bait rolls from side to side or rocks upwardly and downwardly these refractive colored bands 34 disappear on one side or the other or shift position in the body portion thereby creating a highly attractive illusion.

When the bait is viewed from the front side, the smaller lateral dimension of the body portion 10 as seen through the shield portion 12 gives the appearance of an open mouth of a fish. The darker colored effect of the body portion as viewed in this manner creates the illusion of looking into the hollow interior of the open mouth of live bait.

What we claim is:

1. An artificial fish bait comprising, in combination, an elongated body of sufficiently transparent material to transmit daylight therethrough from one side to the other side thereof, said body having a plurality of longitudinally spaced apart substantially parallel passages therein extending in the vertical plane of the body and inclined at an upward and rearward angle, said passages opening out at their lower ends on the bottom side of the body and at their upper ends on the top side of the body and providing for the flow of water therethrough when the body is moved in a forward direction in water, and a coating of material lining the walls of said passages from substantially one end to substantially the other end thereof and colored to contrast with the body to simulate the skeleton structure of a fish.

2. In an artificial fish bait formed of a member of light translucent material and having an elongated body portion, a head portion, and a reduced neck portion connecting said head portion to said body portion, said body portion being provided with a plurality of longitudinally spaced apart substantially parallel passages therein extending in the vertical plane of the body portion and inclined upwardly and rearwardly to the normal direction of movement of the member, said passages being of corresponding circular formation and opening out through the bottom side of the body portion and opening out through the top side of the body portion for the flow of water therethrough when the member is advanced in its normal direction of movement, and a coating of colored material lining the wall of each of said passages from substantially one end to the other end thereof and being visible from the outside of the body portion to simulate the skeleton structure of a fish.

WILLIAM A. VAN HEE.
ACHIEL B. VAN HEE.

REFERENCES CITED

The following references are of record in the file of this patent:

UNITED STATES PATENTS

| Number | Name | Date |
| --- | --- | --- |
| 231,912 | Irgens | Sept. 7, 1880 |
| 284,056 | Pflueger | Aug. 28, 1883 |
| 935,657 | Howe | Oct. 5, 1909 |
| 1,390,458 | Moree | Sept. 13, 1921 |
| 1,854,696 | Herrington | Apr. 19, 1932 |
| 1,892,892 | Jamar | Jan. 3, 1933 |
| 1,999,522 | VanHouten | Apr. 30, 1935 |
| 2,112,901 | Anderson | Apr. 5, 1938 |
| 2,116,994 | Bear | May 10, 1938 |